United States Patent [19]

Karidis et al.

[11] Patent Number: 5,180,955
[45] Date of Patent: Jan. 19, 1993

[54] POSITIONING APPARATUS

[75] Inventors: John P. Karidis, Ossining; Gerard McVicker, Wappingers Falls; Joseph P. Pawletko, Endwell, all of N.Y.

[73] Assignee: International Business Machines Corporation, Armork, N.Y.

[21] Appl. No.: 596,111

[22] Filed: Oct. 11, 1990

[51] Int. Cl.$^5$ ............................................... B25J 9/14
[52] U.S. Cl. .................... 318/568.10; 318/568.12; 318/568.21; 318/569.22; 901/29; 901/15; 310/49 R
[58] Field of Search ................ 318/560–646, 318/687, 135; 901/2, 8, 15, 17, 22, 28, 29, 14, 37, 38, 39, 48; 414/729, 744.5, 735, 738, 917; 395/88–98; 310/49 R

[56] References Cited

U.S. PATENT DOCUMENTS

| | | | |
|---|---|---|---|
| 2,282,608 | 5/1942 | Rempel | 254/122 |
| 2,878,641 | 3/1959 | Decker | 60/10 |
| 3,143,340 | 8/1964 | Maslonka | 268/127 |
| 3,924,146 | 12/1975 | George | 310/36 |
| 4,507,043 | 3/1985 | Flatau | 901/15 |
| 4,509,002 | 4/1985 | Hollis, Jr. | 318/687 |
| 4,514,674 | 4/1985 | Hollis, Jr. et al. | 318/687 |
| 4,535,278 | 8/1985 | Asakawa | 318/135 |
| 4,555,189 | 11/1985 | Donkin | 384/493 |
| 4,626,749 | 12/1986 | Asakawa | 318/135 |
| 4,648,785 | 3/1987 | Nakagawa et al. | 414/744 A |
| 4,874,998 | 10/1989 | Hollis, Jr. | 318/568.21 |
| 4,970,421 | 11/1990 | Kritzinger | 310/49 R |
| 4,980,839 | 12/1990 | Souji et al. | 318/568.22 |
| 5,023,533 | 6/1991 | Tshikawa et al. | 318/568.21 |
| 5,077,510 | 12/1991 | Collie | 318/568.12 |

FOREIGN PATENT DOCUMENTS 0060483 9/1982 European Pat. Off. .
853388 11/1960 United Kingdom .

OTHER PUBLICATIONS

I.B.M. Technical Discl. Bulletin, "High-Speed Micro-Positioner", vol. 30, No. 5, Oct. 1987, pp. 299–300.
"Analysis and Design of a Direct-Drive Arm With a Five-Bar-Link Parallel Drive Mechanism" by Asada and Youcef-Toumi, Journal of Dynamic Systems, Measurements, and Control, vol. 106, Sep. 1984, pp. 225–230.
"Design and Control of a High-Speed Direct-Drive Manipulator" by Youcef-Tuomi and Kuo, Int. J. Prod. Res., vol. 27, No. 3, 1989.
"Design and Analysis of the Statically Balanced Direct-Drive Robot Manipulator" by Kazerooni, Robotics & Computer Integrated Manufacturing, vol. 6, No. 4, 1989, pp. 287–293.
"A Study on Vibration of Flexible Robot Arm–Use of . . . " by Yan, Guo, Takagami and Takano, Journal of the Faculty of Engineering, The University of Tokyo, vol. 39, No. 2, 1987, pp. 111–132.
"A reactionless Precision Pointing Actuator" by Wiktor, Nasa Paper N87-29870 pp. 165–174.
Catalog "Techniques for Digitizing Rotary and Linear Motion", Encoder Division of Dynamics Research Corporation, Chapter 4, The Optical Incremental Encoder 1980, pp. 4–1:4–12.
Advertisement, United Detector Technology, Inc., Position Sensor Series.
Advertisement, SiTek PSD–Position Sensing Detectors for Measurements of Position, Distance and Motion Discloses Optical Sensor.
"Better Performance From Do-It-Yourself Encoders" by Bahniuk, Machine Design, Jan. 26, 1989, pp. 46–49.

*Primary Examiner*—Paul Ip
*Attorney, Agent, or Firm*—Perman & Green

[57] ABSTRACT

An apparatus for positioning an end-effector comprising a multi-bar linkage drive mechanism. The drive mechanism has a base structure of a movable arm structure. The moveable arm structure has four arms arranged in a general parallelogram profile with a center of gravity at a main shaft located at a connection of two of the arms. Two of the arms have energizeable electromagnetic coils and the base structure has permanent magnets for moving the arms. Analog and/or digital position sensors can be used. Dynamic balancing can be provided to produce reactionless ultra-high speed X-Y motion. A torque cancellation motor for cancellation of Z-axis moments produced by these coils can be provided. A Z-direction actuator can also be provided.

25 Claims, 4 Drawing Sheets

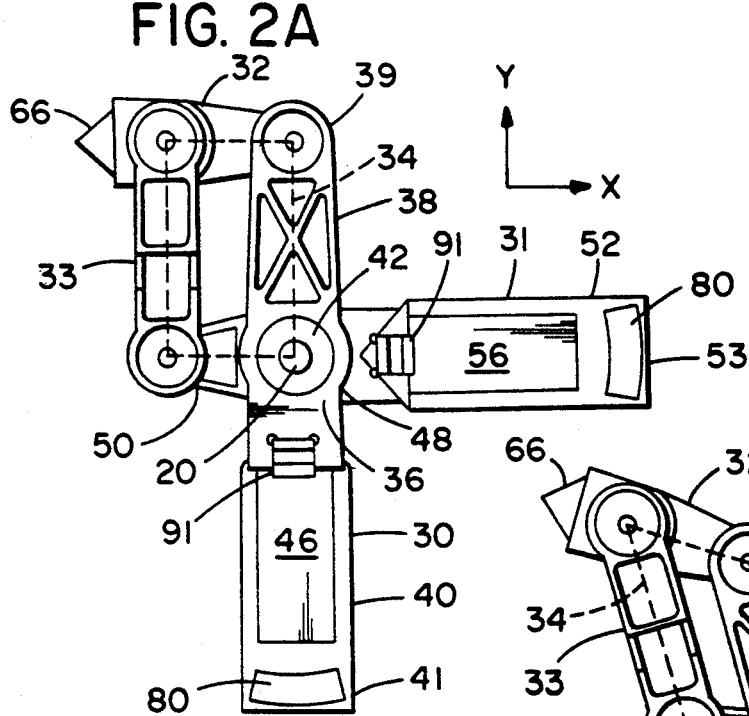
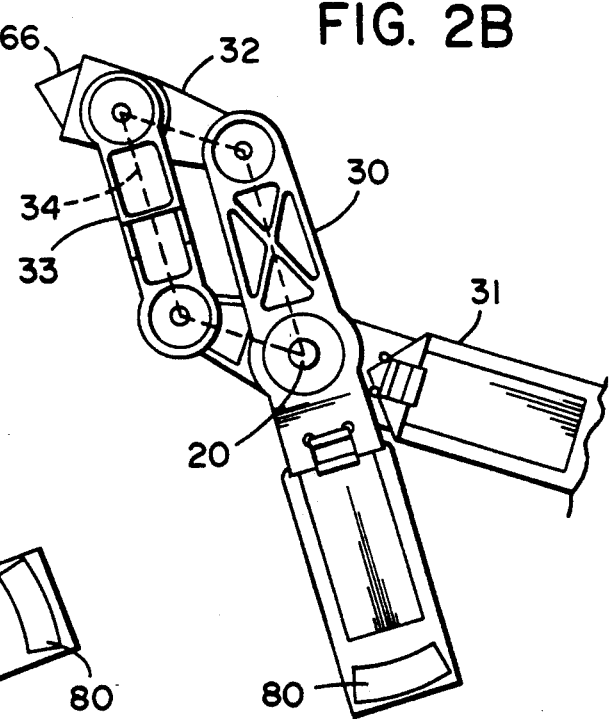
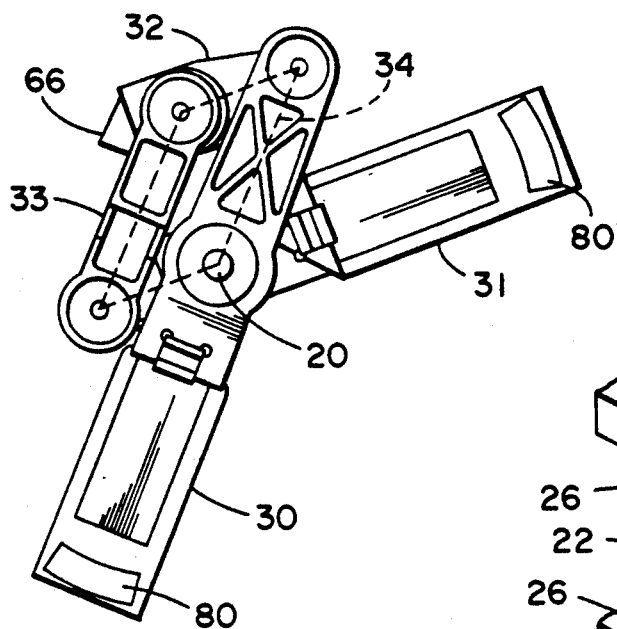
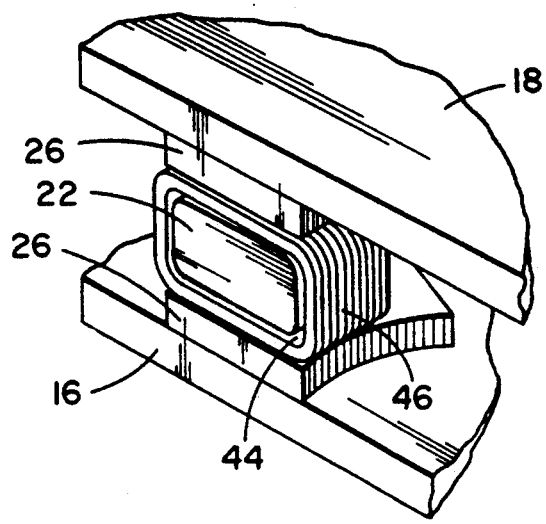

POSITIONING APPARATUS

BACKGROUND OF THE INVENTION

1. Field of the Invention

The present invention relates to a positioning apparatus and, more particularly, to a multi-bar balanced parallelogram-type positioner.

2. Prior Art

The use of a kinematic linkage for positioning applications, such as five-bar and other types, is generally known in the art. One such linkage uses rotary motors to drive two main links of a five-bar linkage to provide two-degree-of-freedom planar positioning capability. In another such linkage, the pivots for the two main links are colinear, but the links are driven by rotary motors above and below the linkage resulting in asymmetry about the mid-line of the linkage and producing obstacles above and below the plane of motion.

However, nowhere in the prior art is there provided a combined linkage and actuator structure that is completely symmetric about the mid-plane to avoid out-of-plane reaction moments. Out-of-plane reaction moments can cause unwanted vibrations of the apparatus or the mounting structure and thus reduce operating performance In addition, none of the known prior art devices use limited angle rotary actuators as extensions of main links to provide a balanced structure with minimum inertia. In robotics, some attempts have been made to provide robots which are balanced against gravity to void the need for continuous actuator effort to counteract gravitational forces on the robot itself or its load. However, this balance has been obtained by adding large counterbalance masses to the robot structure or by using entire actuator assemblies as counterbalance elements, which can severely affect the dynamic performance. Although active torque cancellation devices are known and used to produce reactionless rotary actuators, such as in satellite applications, these cancellation devices have not been used to cancel the reaction moments of a planar positioning device.

It is therefore an objective of the present invention to provide a new improved positioning apparatus that can overcome problems in the prior art as well as provide additional features.

SUMMARY OF THE INVENTION

The foregoing problems are overcome and other advantages are provided by an electromechanical system that provides controlled X-Y motion with high accelerations, high maximum speeds, and high accuracy for positioning an end-effector at predetermined locations.

In accordance with one embodiment of the present invention, a high speed mini-positioner is provided comprising a positioning linkage and means for moving the linkage. The positioning linkage has a changeable parallelogram structure and a base structure. The parallelogram structure has four arms forming a general parallelogram profile with first and second arms pivotably connected to each other at a center shaft at intermediate locations and, each having a first section with a first end and a second section having a second end on opposite sides of the center shaft. Third and fourth arms are pivotably connected to each other proximate first ends thereof and have second ends pivotably connected to the first and second arm second ends. The center shaft is connected to the base structure such that movement of the first and second arm first ends change the general parallelogram profile and move an end-effector proximate the third and fourth arm first ends to a new position. The means for moving the linkage comprises the first and second arm first sections each having an electromagnetic coil and the base structure having magnets located on opposite sides of the coils and stationary iron structures passing through each coil such that a stationary magnetic field passes through the coils and, upon energizing the coils, a lateral magnetic force on the first and second arm first sections can move the first and second arms to change the shape of the general parallelogram profile and move the end-effector to a new location.

In accordance with another embodiment of the present invention, a five-bar linkage drive mechanism is provided comprising a moveable arm structure and a base structure. The moveable arm structure has first and second arms pivotably connected to each other by a shaft at intermediate locations and have first and second sections on opposite sides of the intermediate locations and, third and fourth arms pivotably connected to the first and second arm second sections, respectively, and pivotably connected to each other to form a changeable shape parallelogram type profile. The shaft is located at the center of gravity of the moveable arm structure and supports the moveable arm structure on the base structure. The moveable arm structure is symmetrical about a plane perpendicular to an axis of the shaft such that a balanced and symmetrical mechanism is provided to eliminate reaction moments about at least two axes and to provide passive elimination of net reaction forces in at least two axes to thereby increase velocities and accelerations of movement of the moveable arm structure.

In accordance with another embodiment of the present invention, a system for high speed motion control of a pivotably connected multi-bar linkage drive mechanism is provided. The system comprises a base structure, means for controllably moving portions of two bars in the linkage drive mechanism, means for sensing the position of the two arms relative to the base structure, and means for comparing a sensed position of the two arms relative to a predetermined desired position. The base structure has a shaft pivotally supporting the linkage drive mechanism thereon. The means for controllably moving portions of two bars in the linkage drive mechanism can move the bars relative to the base structure and comprises an electromagnetic coil in each of the two arms, an iron bar passing through each coil and fixedly mounted to the base structure, magnets located on opposite sides of each coil such that a stationary magnetic field passes through each coil, and means for energizing the coils to impose a lateral magnetic force on each of the two arms to move the arms.

In accordance with another embodiment of the present invention, a high speed multi-bar positioner is provided. The positioner comprises a positioning linkage with a changeable parallelogram structure and a relatively stationary base structure, means for moving the parallelogram structure relative to the base structure, and means for sensing movement of the parallelogram structure. The means for moving the parallelogram structure relative to the base structure can position an end defector, connected to the parallelogram structure, to a desired position. The means for sensing movement of the parallelogram structure comprises an optical encoder including two infrared LEDs and four miniature photodetectors facing the same direction and being mounted to an arm of the parallelogram structure and, a corner reflector mounted to the base structure such that light from the LEDs can be directed to the corner reflector and redirected to the photodetectors passing through a stationary and a movable grid structure. Additional means for sensing movement may be provided such as an infrared LED shining radially from an arm of the parallelogram structure onto a position sensitive photodiode.

In accordance with another embodiment of the present invention, a high speed multi-bar positioner is provided. The positioner comprises a positioning linkage with a changeable linkage structure and a stationary base structure, means for changing the shape of the linkage structure, and means for sensing velocity of an arm in the linkage structure. The means for changing the shape of the linkage structure can position an end-effector connected thereto to a desired position. The means for sensing velocity of an arm of the linkage structure comprises a first portion located on the arm and a second portion. The first portion comprises a magnet and two pole plates. The second portion comprises a sensor element with a dense serpentine-like conductive pattern and, the means for sensing further comprises means for measuring inductively coupled voltage on the sensor element induced by movement of the first portion relative to the second portion.

BRIEF DESCRIPTION OF THE DRAWINGS

The foregoing aspects and other features of the present invention are explained in the following description, taken in connection with the accompanying drawings, wherein:

FIG. 2A is a top plan view of the five-bar linkage of the apparatus shown in FIG. 1 at a first position.

FIG. 2B is a top plan view of the five-bar linkage shown in FIG. 2A in a second position.

FIG. 2C is a top plan view of the five-bar linkage shown in FIG. 2A is a third position.

FIG. 3A is a partial cut-away view of the apparatus shown in FIG. 1 at its magnetic drive section.

DETAILED DESCRIPTION OF THE INVENTION

Figure 1:
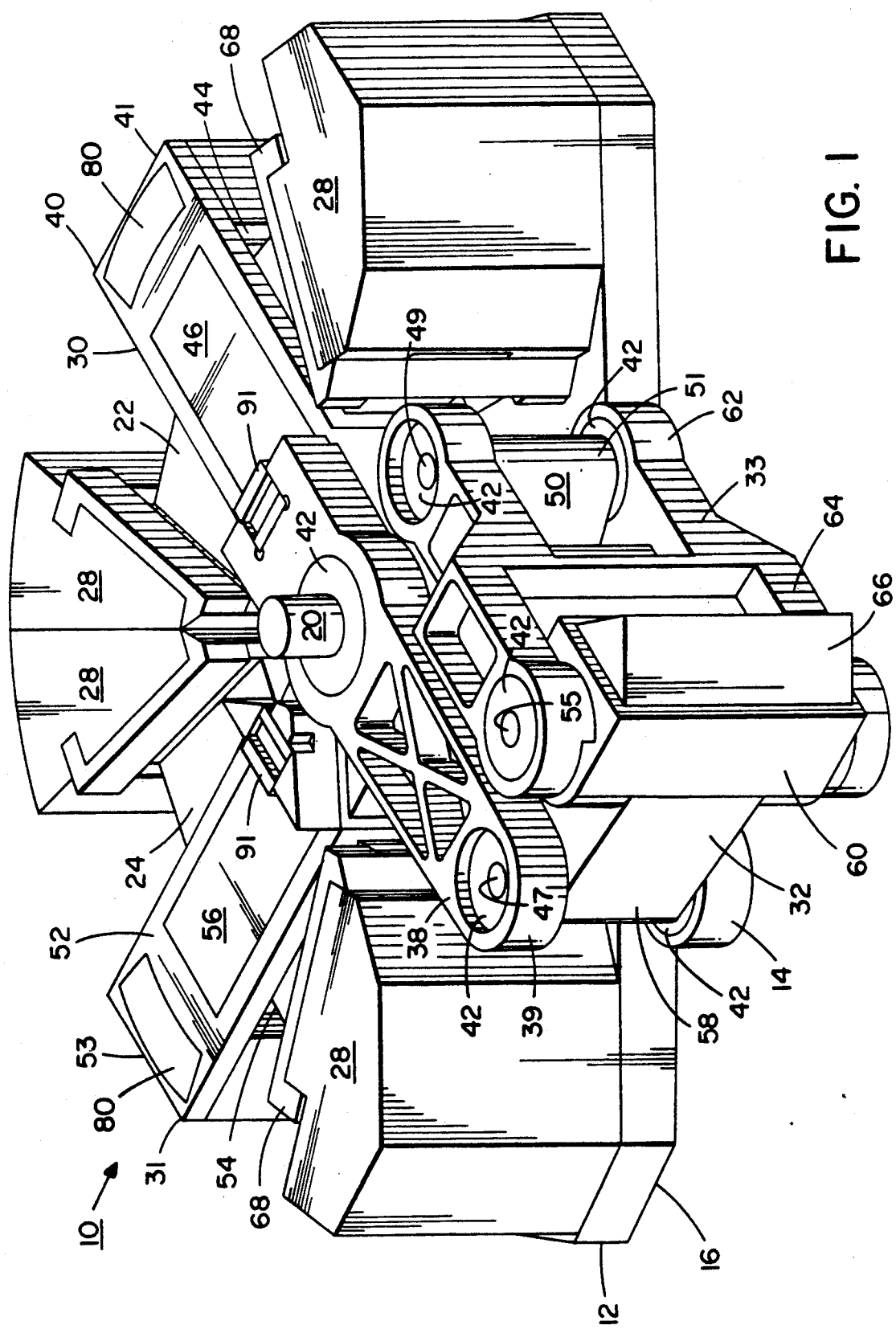
FIG. 1 is a perspective view of an apparatus incorporating features of the present invention with its top plate removed.

Referring to FIG. 1, there is shown a perspective view of an apparatus 10 for positioning an end-effector (not shown) incorporating features of the present invention. The apparatus 10 is shown without its top plate for the purpose of clarity only. Although the positioning apparatus shown in the drawings will be described in some detail, it should be understood that the present invention may include additional or less features than those disclosed herein and may include any suitable size, shape and type of materials as will be further understood from the following description.

The apparatus 10 shown in FIG. 1 generally comprises a stationary base structure 12 and a movable positioning linkage 14. The stationary base structure 12, in the embodiment shown, generally comprises a base plate 16, a top plate 18 (see FIG. 3A), a main shaft 20, two core rods 22 and 24, permanent magnets 26 (see FIG. 3A), and core rod supporting ends 28. The base structure 12 is preferably mounted to a large-area positioner or other type of supporting frame (not shown). The movable positioning linkage 14 generally comprises a five-bar linkage having four links 30, 31, 32, 33. Although the linkage 14 has four links or bars, it is nonetheless considered a five-bar linkage for purposes of mechanism topology because the main shaft 20 is considered a ground link with a zero link length.

Referring also to FIGS. 2A, B and C, there are shown top plan views of the linkage 14 at various positions or orientations. The four bars 30-33 are suitably connected to each other to form a general parallelogram profile area 34 with one corner of the area 34 fixedly located at the main shaft 20. The first bar 30 generally has a middle section 36, a rear section 40 with a first end 41, and a forward section 38 with a second end 39. The middle section 36 has an aperture therethrough and two bearings 42 mounted in the aperture to allow the first bar 30 to be pivotally supported on the main shaft 20. The forward section 38 also has two bearings 42 mounted at the second end 39 for rotatably supporting the third bar 32 thereon. The rear section 40 of the first bar 30 extends away from the main shaft 20 and has a core rod aperture 44 and an electromagnetic drive coil 46 surrounding the aperture 44. Suitable position sensors are located in the first ends 41 and 53 as will be further described below As can be seen with reference also to FIG. 3A, the aperture 44 is generally formed by the coil 46 that surrounds the core rod 22. Located at opposite sides of the coil 46 are the permanent magnets 26 that extend from the top and bottom plates 18 and 16. Both the core rod 22 and permanent magnets 26 are stationary and have a curved profile to match the arced path of the first bar rear section as it is moved. The electromagnetic movement operation will be further described below.

The second bar 31 is similar to the first bar 30 with a middle section 48 having an aperture for passage of the main shaft therethrough and has suitable bearings for rotatably mounting the second bar 31 to the main shaft 20. The second bar 31 also has a forward section 50 with a second end 51 and a rear section 52 with a first end 53. The second bar rear section 52 is substantially the same as the first bar rear section 40 with a core rod aperture 54 and an electromagnetic coil 56. The core rod 24 is suitably curved to match the path of the second bar rear section 52. The second bar forward section 50 contains a pin 49 that extends up and down for rotatably connecting to the fourth bar 33.

The third and fourth bars 32 and 33 are rotatably connected to the first and second bar second ends 39 and 51, respectively. The third bar 32 has a second end 58 connected to the first bar second end 39 by a pin 47 and bearings 42 and, a first end 60. The fourth bar 33 has a second end 62 connected to the second bar second end 51 and, a first end 64. In the embodiment shown, the third bar first end 60 has a Z-axis actuator 66 connected thereto. However, no Z-axis actuator need be provided. The first ends 60 and 64 of the third and fourth bars are rotatably connected to each other by a pin 55 and bearings 42 such that the links form the parallelogram profile area 34. Located at each of the connection points between the bars and at the connection points between the first and second bars and the main shaft, in the embodiment shown, are the two bearings 42 to allow for easy rotation between bars. Each of the pairs of bearings 42 can be axially preloaded and fixedly mounted in place to eliminate bearing clearances and thereby prevent movement or vibrations that might otherwise occur. Due to the interconnected parallelogram type frame provided by the linkage, movement of the first and second bar rear sections 40 and 52 can change the shape of the parallelogram profile area 34 as best illustrated in FIGS. 2A, B and C. In the embodiment shown, the area proximate the third and fourth bar first ends 60 and 64 is intended to receive an end-effector such a testing probe. Any suitable type of testing probe can be used with the apparatus 10 including an electrical testing probe, a mechanical testing probe, or an optical testing probe, etc. The apparatus 10 can also be used for any suitable application including ultra-high speed wire bonding and high speed laser positioning, among others. In the embodiment shown, the testing probe is intended to be mounted on the Z-axis actuator 66. By moving the first and second bar rear sections 40 and 52 the apparatus 10 is able to move the end-effector located proximate the third and fourth bar first ends 60 and 64 to various positions in two axes. The apparatus 10, thus provides an X-Y positioner which can carry a Z-actuator to provide three degree-of-freedom positioning capability.

Figure 3B:
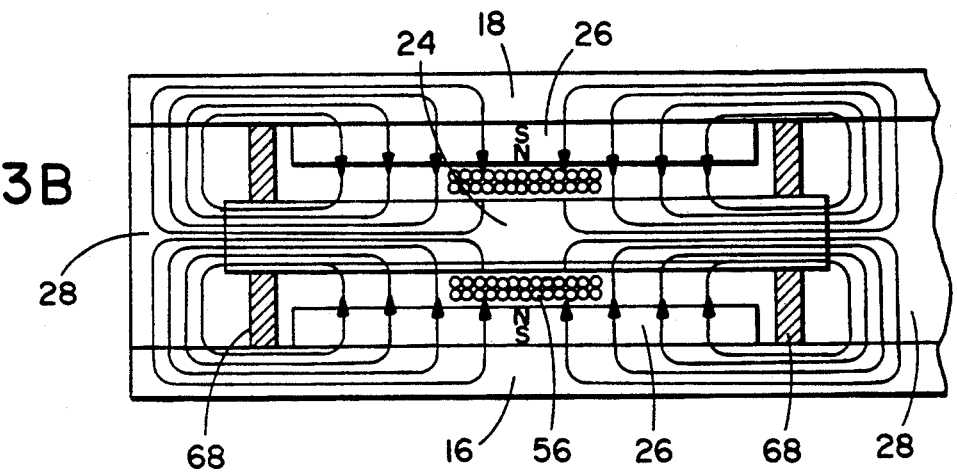
FIG. 3B is an illustrative view of the magnetic drive section of the apparatus shown in FIG. 1.

Referring now principally to FIGS. 1, 3A and 3B, the drive system for the positioning linkage 14 will be described. Generally, the first and second arms 30 and 31 can be moved by two rotary moving-coil actuators formed by the core bars 22 and 24, coils 46 and 56, and magnets 26 made of a suitable material such as Neodymium-Iron-Boron. The magnets 26 provide a stationary magnetic field through the top and bottom portions of the moving coils. When current passes through the coils, the coils experience a lateral Lorentz force which is proportional to the product of the current and the flux density, as is well known in the art. This lateral force produces a torque on each of the main links about the common center pin, which is then servo-controlled so as to control the angular orientation of the main links. To minimize the inductance of the drive coils, the iron structure can be designed to include highly saturated regions or small air gaps to increase the reluctance of the flux paths produced by the coils. In addition, shorted turns 68 can be included as shown to further reduce the apparent inductance of the drive coils through induction of opposing eddy-currents. Obviously, other alternate embodiments of the apparatus 10 could use other types of actuators including variable reluctance motor segments, moving magnet designs with stationary coils, induction devices, superconducting actuators, etc.

One of the principal features of the present invention is the manufacture and construction of the positioning linkage 14. Generally, the components of the linkage 14, including the bars 30-33 and bearings 42, are symmetrical about the x-y plane passing through the middle of the linkage height. This symmetry means that all actuator forces and all inertial reaction forces act in vectors lying in the plane of symmetry. As a result, no reaction torques are generated which would otherwise tend to bend the linkage out of plane and possibly excite resonances of out-of-plane vibrational modes for the linkage. In addition, this planar symmetry eliminates the transmittance of potentially large reaction moments about the X and Y axes to a large-area positioner or other supporting structure during X-Y motion of the apparatus 10.

The design discussed above achieves high rigidity in the Z-direction through the use of dual bearings at each joint and, through the use of symmetric rigid links. An alternative approach is also possible which might be especially attractive for large-area versions of the apparatus 10 and/or applications where large Z-axis reaction forces are required. In this alternate approach, the linkage and bearings are designed to have large stiffnesses in the plane of motion, but to provide little or no stiffness in the out-of-plane direction. The out-of-plane stiffness could then be provided by a stationary reference surface against which the links slide, using, for example, magnetically preloaded air bearings or rolling ball elements. This approach is particularly attractive where larger workspaces and/or tighter vertical positioning tolerances are required, since it would allow the linkage and bearings to be designed for high in-plane stiffness only, thereby allowing them to be much lighter.

The apparatus 10 makes substantial use of subtle passive and active balancing schemes which have been combined in a unique manner to provide reactionless ultra-high-speed X-Y motion with a relatively simple electromechanical system. For the apparatus 10 to be completely reactionless, it must not generate any net forces in the X, Y, or Z directions, nor any net torques about the X, Y or Z axes as a result of the actuator/linkage acceleration or motion. All of these requirements are met in the apparatus 10 through a variety of design features and approaches. As was described previously, the linkage assembly 14 is essentially completely symmetric about a plane through the middle of the actuators and links. As a result, no net forces in the Z-direction or moments about the X and Y axes are generated by the acceleration and movement of the links throughout the workplace. The elimination of all X- and Y-axis reaction forces in the apparatus 10 relies on the fact that the linkage 14 can, under certain circumstances, be designed to be completely balanced about the main shaft 20 for all orientations of the linkage. It can be shown that this ideal condition can always be achieved if the links form a perfect parallelogram and if the center-of-gravity (CG) of each individual link lies along the axis of that link (the line which connects the two bearing points for each link). Under these conditions it is possible to select the masses of the links such that the net CG of the linkage 14 does not move during the linkage motion, but remains fixed at exactly the center of the main shaft 20. In the case of the apparatus shown, the coils and sensors tend to counter balance the links, bearings, and the Z-actuator. A copper coil 46 can be used on the first link 30 with an aluminum coil 56 on the second link 31 to compensate for the obvious imbalance created by the asymmetric locations of the third and fourth links 32 and 33. In an alternate embodiment both coils may be comprised of the same material. To obtain the perfect balance desired for reactionless operation, however, it may be necessary to add small additional counterweights (not shown) to the links which can be adjusted to achieve the desired balance. Of course, the probe or any other item attached to the linkage constitutes part of the linkage itself and is accounted for in the balancing of mini-positioner. By simple consideration of the energy conservation equations for a system of one or more moving bodies, it can be shown that if the net CG of a system does not move (and therefore does not accelerate) in the X-Y plane while the linkage moves to various positions, then there must have been no net reaction forces present on the system during that linkage motion. In other words, because the linkage 14 is perfectly balanced about the main shaft 20, it generates no net reaction forces in the X-Y plane while the linkage provides ultra-fast X-Y positioning of a probe or other feature at the ends of the linkage 14. Although the balanced linkage generates no net reaction forces, as described above, it can generate substantial reaction torques during high-speed motion. In some applications, such reaction torques do not pose as much of a problem as reaction forces might, since the reaction forces in the X-Y plane have a larger effect on the accuracy and stability of some large-area positioners (e.g., linear motor gantries) than do reaction torques In other cases, however, it is necessary to avoid all reaction torques as well as reaction forces. This can be achieved quite readily with the addition of a single rotary torque cancellation actuator 100 (see FIG. 4) whose axis is parallel (although not necessarily coincident) with the main axis of the linkage and which is firmly mounted to the minipositioner 10. If this rotary actuator is used to produce a torque which is equal in magnitude to the algebraic sum of the torques produced by the two link actuators but opposite in direction, then the net torque produced by all three rotary actuators will be zero. The torque produced by the torque cancellation motor of the single rotary actuator acts to accelerate or deccelerate the rotor of that motor, either causing the rotor to rotate back in the direction opposite to the net linkage rotation, or causing the velocity of the motor to increase and decrease about some average velocity command, thus eliminating the non-constant effect of friction which would otherwise occur during reversal of the rotor direction. It should be noted that the torque cancellation actuator itself should be balanced so as not to generate reaction forces during its operation.

There are at least two ways to produce just the right amount of torque with the torque cancellation motor to cancel the reaction torques from the main link actuators. The simplest method makes use of the fact that the torque produced by the link actuators is a known function of the coil current magnitudes and directions, which are in turn a calculated function of the servo-controller. Therefore, the net reaction torque from the two link actuators is theoretically known. If this net reaction torque is divided by the torque constant of the torque cancellation motor, the appropriate current to the torque cancellation motor can be easily determined and applied. This method works well as long as the response of the closed-loop current drivers to all of the actuators have similar response times and if the torque constant for all the devices are relatively constant. Although this open-loop torque cancellation approach should work relatively well, some applications may require nearly perfect cancellation even in the presence of variation in torque constants (e.g., torque ripple). For those cases, a closed-loop scheme can be used where the net torque on the entire three-actuator assembly (two minipositioner axes and one torque cancellation device) could be sensed with appropriate transducers and fed back to the torque cancellation motor so as to maintain near-zero total torque reaction. The practical usefulness of any servo-mechanism depends greatly on the types and qualities of the sensors used. Therefore, several sensors and schemes have been developed for the apparatus 10. Analog sensing of the main link angles can be achieved conveniently by mounting a light-emitting-diode on the first ends of the main links 30 and 31 aimed in an approximately radial direction away from the rotation axis. The angle of the link can then be inferred by monitoring the location of the illuminated spot along a tangential plane using a commercially available position-sensitive photo-diode (PSD). This approach has the advantages of adding little mass to the moving links while providing very high angular resolution (limited only by sensor and electronics noise) at high bandwidths. The one major disadvantage, however, is that the available PSDs are not perfectly linear and are prone to drift with time and temperature. In addition, the output of the LED changes with temperature. Although the non-linearity effect could be corrected with a one-time calibration, the effects of drift are not so easily solved. In other words, this analog approach provides high resolution and precision, but not necessarily high accuracy. This may be suitable for some applications which incorporate some sort of end-point sensing (e.g., machine vision, etc.) to provide the required accuracy, but such end-point sensing schemes are usually not fast enough and/or general enough to be used in extremely high-speed probing applications. Therefore, alternative or additional means are provided for obtaining high positioning accuracy.

Figure 4:
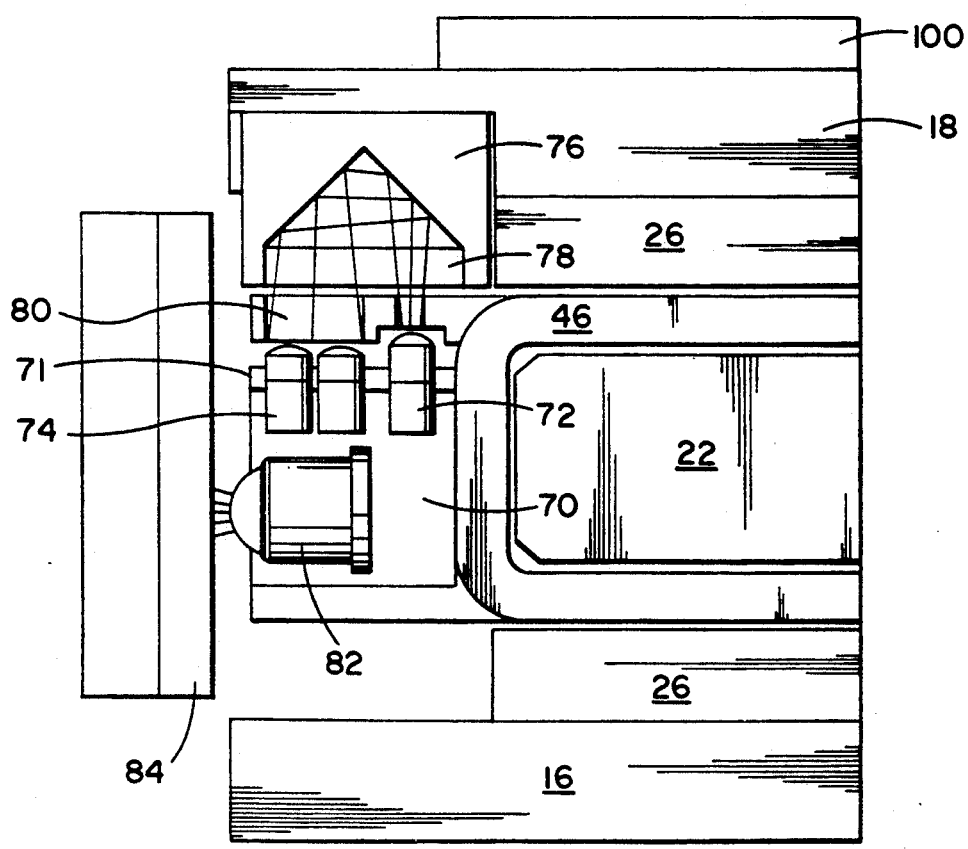
FIG. 4 is a schematic view of the position sensor arrangement of the apparatus shown in FIG. 1.

A standard method for accurate position sensing is the use of optical encoders In a typical rotary optical encoder, a glass grid plate rotates with the device to be monitored, while a stationary sensor containing light sources, light sensors, and a reference phase-plate is used to monitor the position of the moving glass grid. Such an approach was not feasible in the apparatus 10 because the large rotating 'flag' passing a stationary sensor could not be packaged easily and the inertia of the moving portion would be excessive For these reasons, it was necessary to develop an unusual custom optical encoder for the apparatus 10 where a large stationary grid plate is used and the moving portion of the sensor includes the illumination, the optical sensors, and the reference phase plate. Although this approach is somewhat more complicated, it permits very compact packaging that does not interfere with the analog position sensor described above, and does not increase the link inertia excessively. Referring now to FIG. 4, the sensor block 70 contains a small printed circuit board 71 which contains two miniature infrared LEDs 72 (one located behind the one shown in FIG. 4) and four miniature photodetectors 74 (two located behind the two shown in FIG. 4), all of which face the same direction. Since optical encoders incorporating backlighting of the moving and stationary masks have advantages over those that rely on reflection from one of the masks, a novel curved corner reflector 76 is incorporated into the design to provide the necessary backlighting. In this design, the LEDs 72 shine upward illuminating one edge of the corner reflector 76, which then redirects the light horizontally and then downward through the stationary grid plate 78 and the moving reference phase-plate 80, as shown. As in many commercial encoders, the sensor block 70 contains four detectors 74 which provide output signals phased at 0, 90, 180 and 270 degrees. The 0 and 180 degree signals are subtracted to form a modified 0 degree signal which is symmetric about zero volts and is relatively insensitive to changes in illumination intensity and temperature. Similar operations are performed on the 90 and 270 degree output signals to provide a modified 90 degree signal. Finally the modified 0 and 90 degree signals are fed to a quadrature decoder which provides a count which is proportional to position with a resolution of one-fourth of the grating pitch on the glass plates. Higher resolution can then be achieved using standard interpolation techniques for optical encoders. The miniature sensor block 70 also accommodates a separate LED 82 pointing out radially towards the analog position-sensitive-photodiode 84, if desired. An alternative method of providing illumination for the PSD is to mount the separate LED 82 directly into the encoder board 71 facing downward, opposite the direction of the encoder LEDs 72 and, to provide a reflective surface in the block 70 to redirect the light in the radial direction towards the PSD 84. Obviously, both of the main links 30 and 31 would have position sensors.

Some of the disadvantages of digital optical encoders include their difficulty in handling high slew-rates and high resolutions, and the need for extra digital-to-analog converters if they are to be used with an analog servo-controller Analog sensors, however, suffer from the drift and lack of accuracy described earlier. For these reasons, the apparatus 10 has been designed to allow the use of both digital and analog sensors. In this case, the digital encoder can be used to calibrate the analog sensor whenever necessary. Through proper calibration, the digital sensor's accuracy and long-term stability can be combined with the analog sensor's high resolution and bandwidth. Inaccuracies that result from nonlinearities and/or drift in the sensors, sense amplifiers, or analog servo-controller can then be eliminated through the following technique.

First, the digital computer that commands the setpoint for the analog servo-controller is programmed to generate a slow analog ramp function by incrementing the input to a digital-to-analog converter (DAC). As the main links rotate, the digital encoder is monitored and the value of the DAC is recorded at each transition of the digital encoder. The resulting table of DAC values as a function of digital encoder output can be used in an inverse manner to find the necessary DAC value for a desired link angle. Because this calibration can be done in a matter of seconds using only on-board hardware, the analog servo-controller and sensors can be constantly checked and re-calibrated as needed. This approach for calibrating the analog sensors assumes perfect optical encoders. If higher accuracy is required than can be guaranteed by the raw encoders, then the encoders themselves must be calibrated at least once by measuring the link location as a function of encoder output.

Many other sensing and control approaches are also possible given the simultaneous access to analog and digital encoders. One such possibility would be to use the advantages of digital control during the majority of a move, and then switch to analog control for the resolution and bandwith necessary for fastest settle-out and highest positioning resolution.

One of the key factors limiting the performance of a high-speed positioning system is the difficulty in accurately measuring or estimating the velocity of the actuators. This can be done with a variety of velocity sensors or with a position differentiator in an analog system or a state estimator in a digital system. Generally, however, the best performance is achieved when reliable velocity sensor information is available. Given this need, and the fact that no available velocity sensors were suitable for the application, a unique compact, low-mass velocity sensor was conceived.

Figure 5A:
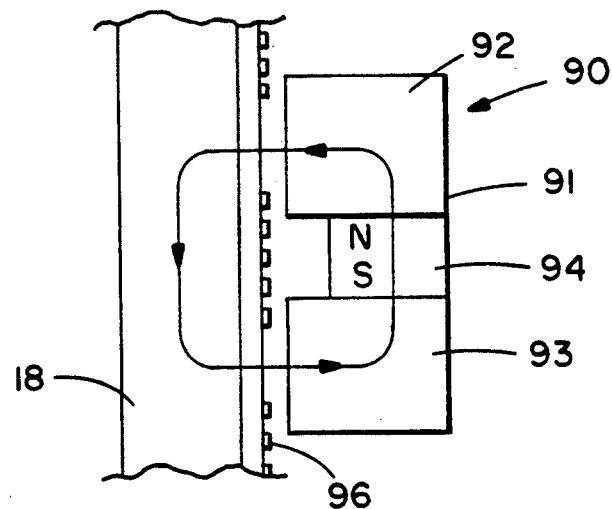
FIG. 5A is a schematic side view of the velocity sensor arrangement of the apparatus shown in FIG. 1.
Figure 5B:
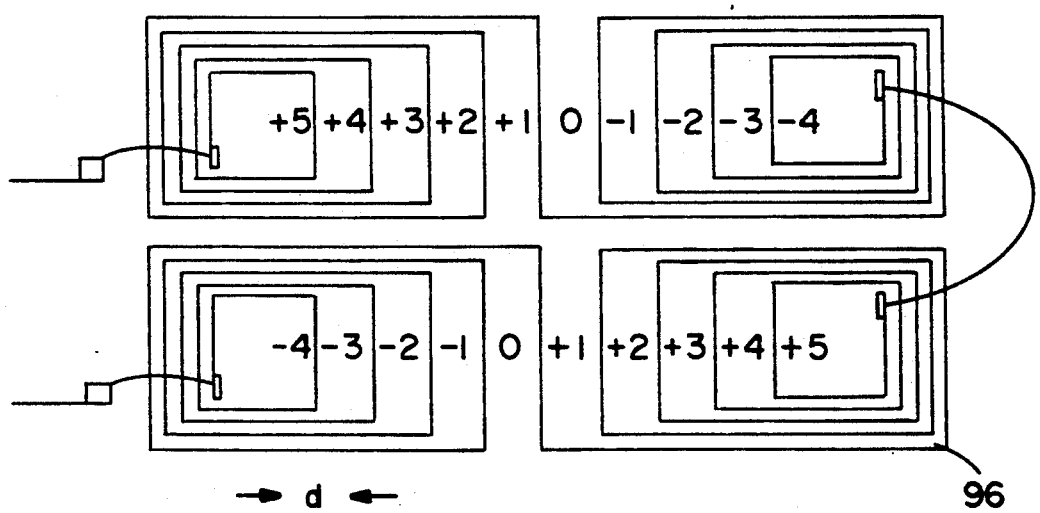
FIG. 5B is a schematic top view of an inductive velocity sensor pattern of the sensor shown in FIG. 5A.

Referring now to FIGS. 5A and 5B, the velocity sensor 90 works by the well-known magnetic induction principle but it makes use of high-resolution photolithography and an unusual flux-coupling path to provide an unusually compact planar device with a very low-mass moving permanent magnet device. The moving portion of the sensor 90 consists of two ferromagnetic pole plates 92 and 93 separated by a small permanent magnet 94. This two-pole magnet assembly 91 moves past the flat sensor element 96, which consists of a dense serpentine-like conductive pattern. As shown in FIG. 5B, (but not shown curved for clarity) the pattern for each sensor consists of four spiral patterns which have been arranged in two arc-shaped segments. When the moving magnet assembly 91 is near one end of the circuit pattern, the magnetic flux emanating from one iron pole and returning to the other pole couples through two of the spiral patterns additively. Because of the winding direction and the shape of the conductive pattern, the total flux linkage in the sense 'coil' changes from a large positive value, through zero, to a large negative value as the magnet block moves from one end of the coil to the other. This allows the block's velocity to be measured simply by measuring the inductively coupled voltage on the sense coil. The novel sensor pattern of two pairs of outward/inward spirals allows a large number of circuit lines to be packaged in a given area for higher sensitivity and also acts to eliminate any effects from stray fields, since those fields will couple uniformly into adjacent, oppositely wound spirals and will thus be cancelled out.

The mini-positioner 10 makes use of three flex-circuits (not shown) to provide power and signal paths from the stationary base to the multiple moving actuators and sensors of the linkage 14. For each of the main links 30 and 31, a single flex cable is used to provide power to the moving coils and the LED's for the analog and digital position sensors, and to provide signal paths for the digital encoder output. A third flex cable travels along links 30 and 32, to provide power, sensing, and probe signal paths for the z-actuator, or other device, which would be mounted at the end of the third link 32. All of the flex circuits originate from a single printed circuit board (not shown) which is mounted behind the mini-positioner. This board contains signal conditioning electronics to buffer the small signals from the many sensors and two connectors, one for power and one for low-level signals, which are used to provide all connections between the mini-positioner and its servo-controller.

Let it be understood that the the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:
1. A high speed mini-positioner comprising:
a positioning linkage having a changeable parallelogram structure and a base structure, said parallelogram structure having four arms forming a general parallelogram profile with first and second arms pivotally connected to each other by a center shaft at intermediate locations and each having a first section with a first end and a second section with a second end on opposite sides of said center shaft and, third and fourth arms pivotally connected to each other proximate first ends thereof and having second ends pivotally connected to said first and second arm second ends, said center shaft being connected to said base structure such that movement of said first and second arm first ends change said general parallelogram profile and move an end-effector proximate said third and fourth arm first ends to a new position; and means for moving said linkage comprising said first and second arm first sections each having an electromagnetic coil and said base structure having magnets located on opposite sides of said coils and stationary iron structures passing through each coil such that a stationary magnetic field passes through said coils and, upon energizing said coils a lateral magnetic force on the first and second arm first sections move said first and second arms to change the shape of said general parallelogram profile and move said end-effector to a new location.

2. A mini-positioner as in claim 1 wherein said positioning linkage is capable of moving said end-effector in two axes, and further comprises a third axis actuator on said third arm first end with said end-effector mounted thereto.

3. A mini-positioner as in claim 2 wherein said parallelogram structure, third axis actuator, and end-effector have a center of gravity at said center shaft for substantially all orientations.

4. A mini-positioner as in claim 1 wherein said parallelogram structure has dual bearings at each joint of said arms.

5. A mini-positioner as in claim 1 further comprising a stationary reference surface against which the arms can slide with aid of suitable friction reduction means.

6. A mini-positioner as in claim 1 wherein said parallelogram structure is symmetrical about a plane perpendicular to an axis of said center shaft.

7. A mini-positioner as in claim 1 further comprising means for sensing the position of said first and second arms.

8. A mini-positioner as in claim 7 further comprising dual analog and digital position sensors.

9. A mini-positioner as in claim 1 further comprising means for sensing the velocity of said first and second arms.

10. A mini-positioner as in claim 1 further comprising means for balancing said parallelogram structure on said base structure at said center shaft.

11. A mini-positioner as in claim 1 further comprising means for cancelling net torque produced by said means for moving said linkage.

12. A five-bar linkage drive mechanism comprising:
a movable arm structure having first and second arms pivotably connected to each other by a shaft at intermediate locations and having first and second sections on opposite sides of said intermediate locations and, third and fourth arms pivotally connected to said first and second arm second sections, respectively, and pivotally connected to each other to form a changeable shape parallelogram type profile; and
a base structure having said shaft connected thereto, said shaft being located at the center of gravity of said movable arm structure and supporting said movable arm structure on said base structure and, said movable arm structure being symmetrical about a plane perpendicular to an axis of said shaft such that a balanced and symmetrical mechanism is provided to eliminate reaction moments about at least two axes and to provide passive elimination of net reaction forces in at least two axes to thereby reduce vibrations that could otherwise be generated from the acceleration and motion of said movable arm structure.

13. A mechanism as in claim 12 wherein said movable arm structure is capable of moving a third arm first end in two axes and said third arm first end has a third axis actuator mounted thereon.

14. A mechanism as in claim 12 further comprising means for moving said first and second arms relative to said base structure.

15. A mechanism as in claim 14 wherein said means for moving comprises coils on said first and second arms, stationary magnets on said base structure, and means for selectively energizing said coils.

16. A mechanism as in claim 12 further comprising means for sensing the position of said first and second arms.

17. A mechanism as in claim 12 further comprising means for sensing the velocity of said first and second arms.

18. A mechanism as in claim 14 further comprising means for cancelling torque forces generated by said means for moving said first and second arms.

19. A system for high speed motion control of a pivotally connected multi-bar linkage drive mechanism, the system comprising:
a base structure having a shaft pivotably supporting said linkage drive mechanism thereon;
means for controllably moving portions of two bars in said linkage drive mechanism relative to said base structure comprising an electromagnetic coil in each of said two arms, an iron bar passing through each coil and fixedly mounted to said base structure, magnets located on opposite sides of each coil such that a stationary magnetic field passes through each coil, and means for energizing said coils to impose a lateral magnetic force on each of said two arms to move said two arms;
means for sensing the position of said two arms relative to said base structure; and
means for comparing sensed position of said two arms relative to a predetermined desired position.

20. A system as in claim 19 further comprising means for sensing the velocity of said two arms.

21. A system as in claim 19 wherein said means for sensing comprises both analog sensors and digital sensors.

22. A system as in claim 21 further comprising means for calibrating said analog sensors including said digital sensors.

23. A high speed multi-bar positioner comprising:
a positioning linkage with a changeable linkage structure and a stationary base structure;
means for changing the shape of said linkage structure to position an end-effector connected thereto to a desired position; and
means for sensing velocity of at least one arm in said linkage structure, said means for sensing comprising a first portion located on said arm and a second portion, said first portion comprising a magnet and two pole plates, said second portion comprising a sensor element with a dense serpentine-like conductive pattern and, said means for sensing further comprising means for measuring inductively coupled voltage on said sensor element inducted by movement of said first portion relative to said second portion.

24. A positioner as in claim 23 wherein said sensor element pattern has four spirals, two outward spirals and two inward spirals that are interconnected in series arrangement.

25. A positioner as in claim 24 wherein magnetic flux can travel from one pole plate and pass through two spirals before returning to the other pole plate.

* * * * *